(12) United States Patent
Caruana

(10) Patent No.: US 8,508,334 B2
(45) Date of Patent: *Aug. 13, 2013

(54) INDUCTIVE COUPLING EXCHANGE IN A PORTABLE INTELLIGENT OBJECT WITH CENTRAL AND PERIPHERAL CIRCUITS

(75) Inventor: Jean-Paul Caruana, Marseilles (FR)

(73) Assignee: Gemalto SA, Meudon (FR)

( * ) Notice: Subject to any disclaimer, the term of this patent is extended or adjusted under 35 U.S.C. 154(b) by 418 days.

This patent is subject to a terminal disclaimer.

(21) Appl. No.: 12/042,089

(22) Filed: Mar. 4, 2008

(65) Prior Publication Data

US 2008/0297315 A1 Dec. 4, 2008

Related U.S. Application Data

(62) Division of application No. 10/500,849, filed as application No. PCT/FR03/00084 on Jan. 13, 2003, now Pat. No. 7,337,974.

(30) Foreign Application Priority Data

Jan. 16, 2002 (FR) .................................. 02 00504

(51) Int. Cl.
*H04Q 5/00* (2006.01)

(52) U.S. Cl.
USPC .................. 340/5.61; 340/10.1; 340/5.64

(58) Field of Classification Search
USPC ............ 340/10.1, 10.2, 10.3, 10.5; 235/492, 235/491, 380, 375
See application file for complete search history.

(56) References Cited

U.S. PATENT DOCUMENTS

| 6,073,855 | A | * | 6/2000 | MacKenthun | 235/492 |
| 6,112,985 | A | * | 9/2000 | Weinlaender | 235/380 |
| 6,577,229 | B1 | * | 6/2003 | Bonneau et al. | 340/10.41 |
| 6,724,103 | B2 | * | 4/2004 | Parrault | 307/104 |
| 2004/0236442 | A1 | * | 11/2004 | Maymudes | 700/83 |

FOREIGN PATENT DOCUMENTS

WO WO 0201497 A1 * 1/2002

* cited by examiner

*Primary Examiner* — Nabil Syed
(74) *Attorney, Agent, or Firm* — Buchanan Ingersoll & Rooney PC

(57) ABSTRACT

A portable intelligent object has first and second communication interfaces with a station. The first communication interface can send and/or receive data by means of inductive coupling with the station. The object also has an integrated peripheral circuit. All of the data exchanged between the peripheral circuit and the central circuit passes through the station.

23 Claims, 2 Drawing Sheets

INDUCTIVE COUPLING EXCHANGE IN A PORTABLE INTELLIGENT OBJECT WITH CENTRAL AND PERIPHERAL CIRCUITS

This application is a continuation application of application Ser. No. 10/500,849, filed Jul. 7, 2004, which is based upon French Application No. 0200504, filed Jan. 16, 2002, and International Application No. PCT/FR03/00084, filed Jan. 13, 2003, the contents of which are incorporated herein by reference.

BACKGROUND OF THE INVENTION

The field of the invention is that of intelligent portable objects such as a chip card or transponder, and more particularly data exchanges by inductive coupling within such an object.

It finds an application in particular in access control, identification or data processing (display, entry) by means of an intelligent portable object such as a chip card, an electronic label or the like.

Documents in the field of the invention will be cited.

The document EP0057602 describes an intelligent portable object for the payment of services. This device comprises an integrated circuit chip, integrated, via a bus grouping together conductive wires, with other components of the device, including an antenna, a display screen and an entry keyboard. This document therefore provides only the internal components communicating exclusively via a contactless connection with an external station.

The document U.S. Pat. No. 6,073,855B describes an apparatus for the reception, maintenance and transmission of information and data. The apparatus comprising a main computer and at least two cards to the PCMCIA format, placed in parallel in a dedicated compartment. An interface affords communication between the PCMCIA cards. The communication interface can divert the data, which must normally pass via a standard bus which physically connects the PCMCIA cards to the main computer, in order to accelerate the transmission of information and data, for example by capacitive, optical or inductive coupling. Since it is a case of accelerating the transfer rate, this document does not make provision for replacing the physical connection with a contactless link.

The document U.S. Pat. No. 5,537,126 describes a system for displaying information at a place of sale, by means of electronic display labels. The labels are in electromagnetic coupling with a conductor. A control circuit is used for producing an information signal which contains the address of the label and data. A modulator circuit converts an alternating current into an information signal and applies it to the conductor for transmission thereof to the display labels. Each of the labels is equipped with an electromagnetic coil coupled to the conductor. Each of the display labels is equipped with a manual initialization switch. A microprocessor is also provided in the label as well as an internal memory.

The document DE4138131 describes a chip card with microprocessor, display screen and integrated memory supplied by a solar sensor. Communication between the card and an external unit in read/write mode is contactless, for example by optical, capacitive or inductive transmission. The microprocessor, the memory, the display and the solar energy sensor are physically connected to the inside of the card by conductors.

The document DE19604206 describes an intelligent portable object for the transmission of secure data. This intelligent portable object has a card body made from plastics material, to the format of a credit card. In part of the card a keypad is housed, with the function keys. Under the keypad galvanic conductors connect rows and columns together in a matrix to a control unit. The intelligent portable object is also equipped with an antenna, embedded in the body.

The document U.S. Pat. No. 4,874,934 describes a chip card which is composed of a central processing unit, data memories and memories for the programs, as well as a display control consisting of a chip. The card components are connected physically.

Contactless intelligent portable objects comprising a contactless communication interface able to send or receive data by inductive coupling with a station are therefore known. Generally, the contactless communication interface comprises an antenna coil connected to a capacitor, an integrated circuit such as a chip or another component. Contactless intelligent portable objects have a peripheral circuit such as a display and a chip connected to this peripheral circuit. The chip performs identification and/or authentication functionalities, referred to as "central" or "principal" with respect to the so-called "peripheral" display function of the display.

These peripherals, for example the displays, have the drawback of having characteristics in terms of operating voltage and current which are not easy to make compatible with those of the chips. In addition, implementing connections between the chip and the peripheral is detrimental to the production cost of the intelligent portable objects.

The invention aims to remedy these drawbacks, and is defined in the claims.

SUMMARY OF THE INVENTION

By virtue of the invention, the data exchanged between the peripheral circuit and the central circuit all passes via the station, which makes it possible to omit the connection between the peripheral circuit and the central circuit. The result is a simple and inexpensive fitting of the peripheral circuit.

BRIEF DESCRIPTION OF THE DRAWINGS

Other characteristics and advantages of the invention will emerge from the following description of examples.

DETAILED DESCRIPTION

Figure 1:
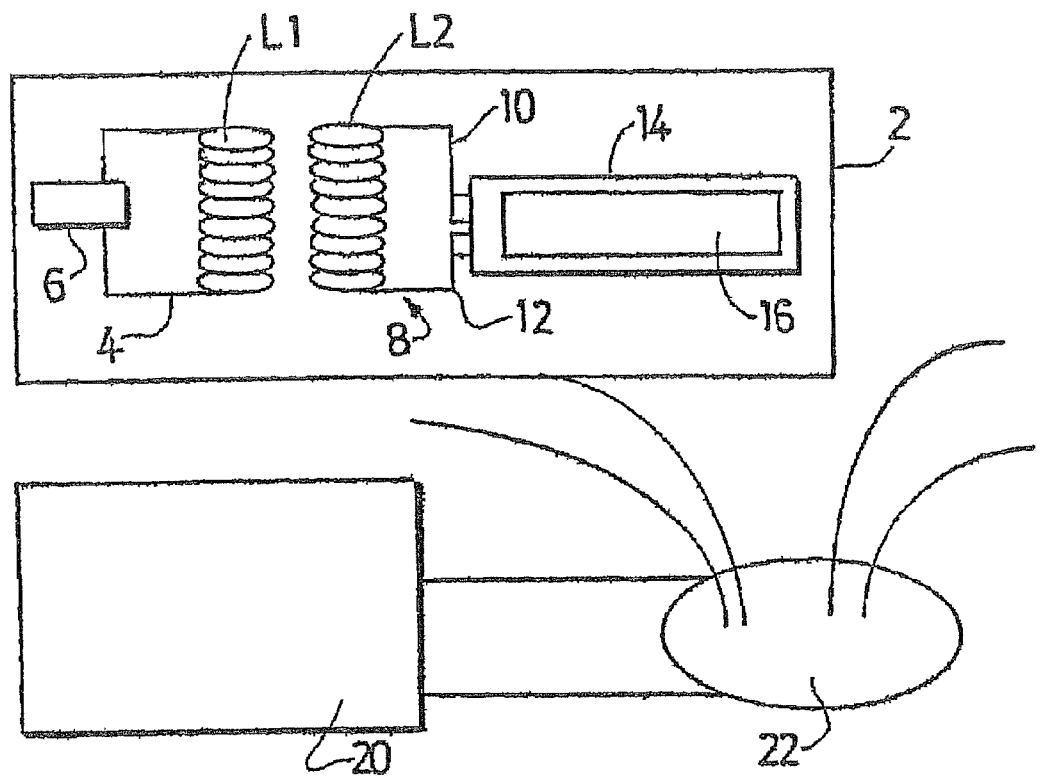
FIG. 1 is a schematic view of a transponder with two contactless communication interfaces according to the invention.

In FIG. 1, an intelligent portable object 2 comprises a contactless communication interface 4 which comprises an antenna coil L1 connected to an integrated circuit 6 referred to as a chip. This chip 6 performs the identification and/or authentication functionalities, referred to as "central" or "principal".

Intelligent portable object means here any apparatus or device able to effect detection or communication by means of an electromagnetic field. It is a case for example of chip cards, electronic labels or the like.

This intelligent portable object 2 comprises another contactless communication interface 8 which comprises another antenna coil L2.

Pins 10 and 12 of the antenna coil L2 are connected to an integrated circuit 14 fulfilling a peripheral function. Peripheral 14 is therefore spoken of. This peripheral 14 is in the figures a display peripheral. In other designs, the peripheral 14 is a keypad, a sensor, for example biometric, a light-emitting diode or the like.

This peripheral 14 performs so-called "peripheral" functionalities, here of display, compared with the identification and/or authentication functionalities, referred to as "central" or "principal", of the chip 6.

The intelligent portable object 2 according to the invention is able to communicate without contact or at a distance with a reader or station 20 comprising an antenna 22.

The station 20 is here a sending/receiving device provided with an antenna which creates an electromagnetic field at a given frequency.

The antenna 22 of the device forming a station 20 makes it possible to modulate the electromagnetic field and to measure variations in this field. To this end, the antenna 22 of the station 20 in general comprises one or more coils. The inductive coupling between the object 2 and the station 20 is achieved when this object 2 is at a given distance, referred to as the "proximity" distance, from the station 20. According to the objects 2 and stations 20, this distance is from around a few millimetres to a few metres.

The circuit 14 comprises here a display area 16. This circuit 14 is here able to be supplied by the current induced in the coil L2 when the coil L2 is in inductive coupling with the antenna 22 of the station 20. The circuit 14 is also able to extract from this induced current information intended to be displayed.

Figure 2:
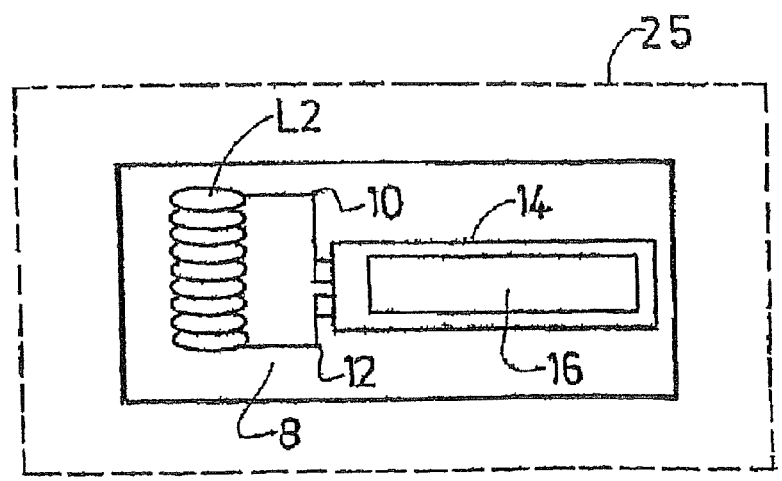
FIG. 2 illustrates schematically an intelligent portable object according to the invention, able to communicate without contact and equipped with a display.

In practice, the induced current comes from an electromagnetic field emitted by the station 20, for example a badge reader or a chip card reader. In FIG. 2, the intelligent portable object 2 is a chip card to the ISO 7816 format, contactless or mixed, that is to say with an interface with contacts and an interface without contact.

In the latter case, the mixed card cooperates with a reader (not shown) having a communication interface with contact as well as a communication interface without contact.

In FIG. 1 or 2, the high voltages at the terminals of the antenna L2 are obtained throughout the operating spectrum of the object 2. Thus, high voltages being necessary for displays, in particular with a remanent screen, the invention is able to integrate such peripherals 14.

In practice, the resonant circuits formed by the first communication interface 4 and the second communication interface 8 are chosen so that they are tuned to frequencies close to one another, and so that the frequency resulting from the coupling of the two coils L1 and L2 is adapted to the frequency required by the station 20.

The peripheral 14 is, according to the examples, a contactless display or a standard commercially available display provided with a control device (driver) with a protocol for the exchange of data by means of a serial link. In the latter case, a matching circuit is used for producing, from the current induced in the coil L2, all the signals necessary for the functioning of this peripheral 14.

According to another example of the invention, the peripheral 14 fulfils the function of entry keypad. This peripheral 14 forming a keypad is also of the contactless type. This peripheral 14 is able to dialogue with the contactless reader via an electromagnetic field in the same way as the chip 6 or display mentioned above, and according to the same principle, namely a modulation of the electromagnetic field.

Such a peripheral 14 forming a contactless keypad makes it possible in particular to omit keypads on the terminals such as the station 20. Thus this peripheral 14 helps to reduce the costs of the system and in particular to increase the security of the stations 20; this is because the keypad of a station 20 which has a direct interface with the outside world is a favoured entry point for external attacks.

In addition, the contactless peripheral 14 being provided with electric current, that is to say "self-supplied" by the induced current, the entry of a secret code is more difficult to spy on that that which is performed on a station keypad 20.

Figure 3:
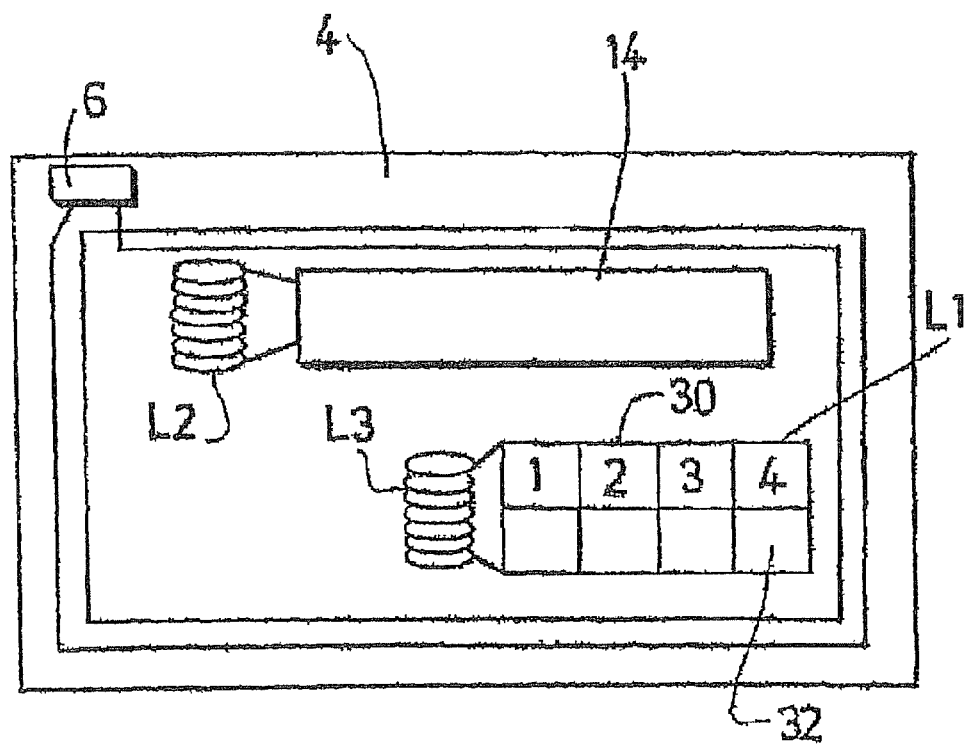
FIG. 3 illustrates schematically a contactless intelligent portable object equipped with an integrated circuit forming a chip, a contactless circuit forming a display and a contactless integrated circuit forming a keypad according to the invention.
Figure 3:
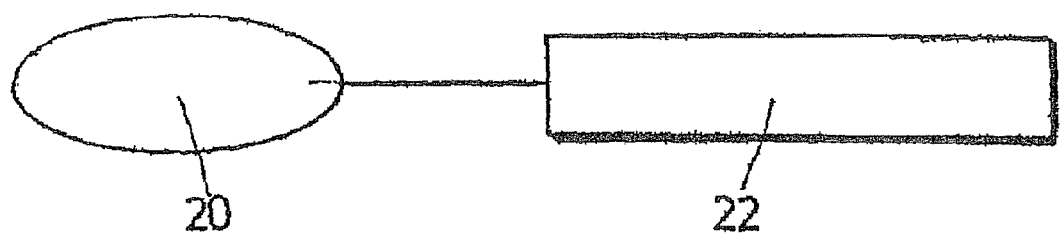

In one example, the intelligent portable object 2 comprises several peripherals, such as a contactless keypad and a display. Thus, in FIG. 3, two contactless peripheral circuits are integrated in the intelligent portable object 2, one forming a display 14, the other forming a keypad 30. This circuit forming a contactless keypad 30 comprises several keys 32. This keypad 30 has a resonant circuit able to send to the reader or station 20 information corresponding to the key 32 pressed by the user.

Likewise, a contactless light-emitting diode (not shown) associated with another resonant circuit makes it possible, by means of a display, to confirm that all the contactless peripheral circuits in the intelligent portable object 2 are supplied by the electromagnetic field.

In one embodiment, the station 20 exchanges data with the integrated circuit forming a chip 6 by means of an amplitude modulation, according to a protocol in accordance with a current standard, for example ISO 14443.

The exchanges with the circuits forming a contactless keypad 30, contactless display 14 and contactless light-emitting diode take place using an amplitude modulation having characteristics different from those of the modulation between the chip 6 and the reader 20 so as to allow the selection by the reader of the contactless peripheral element in question.

For example, in the context of a unilateral exchange with the contactless display 14, this display 14 requires solely the reception of data. In this case, provision is made to modulate the antenna coil L2 according to a lower rate than that effected with the integrated circuit 6 and the associated antenna coil L1.

Thus, in the case of a modulation of the ISO 14443 type corresponding to a data exchange between the chip 6 and the station 20 at a rate of 106 kilobits per second with an amplitude modulation rate of 100% and pause times of 3 microseconds, provision is made to use exchanges with the display 14 with a lower data modulation rate, for example around 10%, and a rate less than 26 kilobits per second.

In this way, the data exchanges to the chip 6 are exclusively understood by the chip alone. Similarly, exchanges to the display 14 are understood only by the display 14.

With regard to the unilateral exchanges from the contactless keypad 30 to the reader 20, it is possible to use a similar rate in order to be discriminated from the other contactless peripheral elements.

For example, by pressing or exerting a pressure on a key 32, it is possible to trigger a low-frequency pulse generator, for example of a few kHz, and the number of these pulses corresponds to the keycode pressed.

The reader 20 then detects these pulses, which modulate the antenna coil 22 of the reader 20.

The reader 20 deduces therefrom the pulses thus triggered.

Other more sophisticated selection modes can be used in order to implement the selection of the contactless peripheral element. For example, selection mechanisms by anti-collision can be used, such as anti-collision systems by the selection of series numbers.

By virtue of the invention, it is possible to use a protocol according to which the communications between the intelligent portable object 2 and the station 20 take place via the station, so that, if a data item is to be displayed, it must be sent by the station 20 to the display 14 by means of the electromagnetic field.

The same applies to the chip 6 which, in order to display information, sends it first of all to the station 20, which is then responsible for sending it to the display 14.

Thus all the data sent and received by the contactless peripheral element pass via the station.

The advantage of such a protocol is to provide the intelligent portable objects with at least one contactless peripheral element which requires no cabled connection between the central processing unit of the intelligent portable object and the contactless peripheral element.

The invention claimed is:

1. A system for exchanging data with portable intelligent objects, comprising:
   at least one portable intelligent object having a data processing circuit connected to a first contactless interface and a peripheral circuit connected to a second contactless interface; and
   a reader including an antenna that (i) is inductively coupled to the first contactless interface of said data processing circuit and to the second contactless interface of said peripheral circuit and (ii) communicates directly, via said inductive coupling, with both the data processing circuit of a portable intelligent object and the peripheral circuit of a portable intelligent object via their respective contactless interfaces, such that all data exchanged between the data processing circuit of a portable intelligent object and the peripheral circuit of a portable intelligent object is communicated directly by said antenna of said reader to the respective contactless interfaces of the data processing circuit and the peripheral circuit.

2. The system of claim 1, wherein said peripheral circuit comprises at least one of a display, a keypad, a sensor and a light-emitting device.

3. The system of claim 1, wherein said portable intelligent object includes a plurality of peripheral circuits, each being connected to a respective contactless interface for communicating with said reader.

4. The system of claim 1, wherein the peripheral circuit of a portable intelligent object is electronically isolated from the data processing circuit of said portable intelligent object.

5. A method of exchanging data by means of intelligent portable objects each including:
   at least first and second communication interfaces inductively coupled to a common antenna of a reader;
   at least one peripheral circuit connected to the first communication interface; and
   a data processing circuit connected to the second communication interface, wherein the method comprises:
   communicating data, via the common antenna of the reader, such that all data exchanged between the peripheral circuit of an intelligent portable object and the data processing circuit of an intelligent portable object is communicated directly by the common antenna of the reader to the respective contactless interfaces of the data processing circuit and the peripheral circuit.

6. The method according to claim 5, wherein when data transmission is in the direction from data processing circuit to the peripheral circuit, further including the step of modulating the load on the first communication interface in a manner different from that of the second communication interface.

7. The method according to claim 6, wherein the modulation of the load on the first communication interface is an amplitude modulation with a degree of modulation of the data of around 10% and the modulation of the load on the second communication interface is an amplitude modulation with a degree of modulation of the data of around 100%.

8. The method according to claim 5, wherein when data transmission is in the direction from peripheral circuit to the data processing circuit, further including the step of modulating the load on the reader according to a modulation for transmitting data from the peripheral circuit to the data processing circuit via the reader.

9. The method according to claim 5, wherein the intelligent portable object contains a plurality of peripheral circuits each connected to a first contactless communication interface, and wherein the data exchanged between the data processing circuit of an intelligent portable object and each peripheral circuit of an intelligent portable object passes via the reader.

10. An intelligent portable object comprising:
    a data processing circuit connected to a first contactless interface that communicates directly with an antenna of an external reader via inductive coupling; and
    a peripheral circuit connected to a second contactless interface that communicates directly, via inductive coupling, with said antenna of said external reader with which said first contactless interface communicates, wherein all data exchanged between the peripheral circuit of an intelligent portable object and the data processing circuit of an intelligent portable object is communicated directly by a common antenna of said external reader through their respective contactless interfaces.

11. The portable object of claim 10, wherein said peripheral circuit comprises at least one of a display, a keypad, a sensor and a light-emitting device.

12. The portable object of claim 10 comprising a plurality of peripheral circuits, each being connected to a respective contactless interface for communicating with said reader.

13. A peripheral circuit for use within an intelligent portable object having a central data processing circuit, comprising:
    an interface for direct communication by inductive coupling with an antenna of a reader, wherein
    said peripheral circuit exchanges all data with the central data processing circuit of an intelligent portable object via said inductive coupling with the antenna of the reader, without utilizing any conductive physical connection to the central data processing circuit.

14. A circuit according to claim 13, wherein said peripheral circuit is a circuit forming a display.

15. A circuit according to claim 13, wherein said peripheral circuit is a circuit forming a keypad.

16. The system according to claim 1, wherein said at least one portable intelligent object includes one of a chip card and an electronic label.

17. The method according to claim 5, wherein at least one of the intelligent portable objects includes one of a chip card and an electronic label.

18. The intelligent portable object according to claim 10, wherein the intelligent portable object includes one of a chip card and an electronic label.

19. The peripheral circuit according to claim 13, wherein the intelligent portable object, within which the peripheral circuit is used, includes one of a chip card and an electronic label.

20. An intelligent portable object comprising:
    a peripheral circuit connected to a contactless interface that communicates directly, via inductive coupling, with an antenna of an external reader, wherein said peripheral circuit, through its contactless interface, exchanges all data with a central data processing circuit of another intelligent portable object via inductive coupling with the antenna of the external reader.

21. The intelligent portable object of claim 20 wherein said peripheral circuit is a circuit forming a display.

22. The intelligent portable object of claim 20 wherein said peripheral circuit is a circuit forming a keypad.

23. The intelligent portable object of claim 20 wherein the intelligent portable object includes one of a chip card and an electronic label.

\* \* \* \* \*